United States Patent [19]
Jefferis et al.

[11] 3,982,075
[45] Sept. 21, 1976

[54] SYNCHRONIZATION SYSTEM FOR TIME DIVISION MULTIPLE ACCESS RELAY COMMUNICATIONS SYSTEM

[75] Inventors: Alan Kenneth Jefferis, Reading; Kevin Hodson, Billericay, both of England

[73] Assignee: The Post Office, London, England

[22] Filed: Sept. 9, 1974

[21] Appl. No.: 504,349

[52] U.S. Cl. .................................. 179/15 BS; 325/4
[51] Int. Cl.² .......................................... H04J 3/06
[58] Field of Search .................. 179/15 BS, 15 BP; 325/4; 178/69.5 R; 324/83 D, 83 FE

[56] References Cited
UNITED STATES PATENTS

| | | | |
|---|---|---|---|
| 3,562,432 | 2/1971 | Gabbard | 325/4 X |
| 3,764,903 | 10/1973 | Griswold | 324/83 D |
| 3,843,843 | 10/1974 | Solomon | 179/15 BS |
| 3,858,007 | 12/1974 | Ganssmantel | 179/15 BS |

*Primary Examiner*—David L. Stewart
*Attorney, Agent, or Firm*—Cushman, Darby & Cushman

[57] ABSTRACT

A Time-Division Multiple Access (TDMA) synchronization system for a satellite relay system is provided by designating one of the ground stations a "Reference" station and arranging for a sinusoidal signal transmitted from the reference station to be received by other ground stations via the satellite and compared with their own sinusoidal synchronization signals after transmission to and from the satellite. The sinusoidal signal from the "Reference" station uses only a small proportion of the bandwidth of a satellite global beam transponder. Most of the traffic is transmitted to one or more spot beam transponders of the satellite. Each station derives from its symbol-rate clock a pulse indicating the start of each TDMA frame and a local synchronization sinusoidal signal at the frame repetition frequency. The phase of this local sinusoidal signal is such that its positive-going zero crossings coincide with the frame-start pulses. These local sinusoidal signals transmitted and received back through the satellite using high-index frequency modulation are compared in phase with the received Reference station sinusoidal signal. The phase difference signal derived from the comparison of the local and reference sinusoidal signals is used to adjust the station's transmit frame timing to achieve synchronization with the reference station frame timing.

31 Claims, 5 Drawing Figures

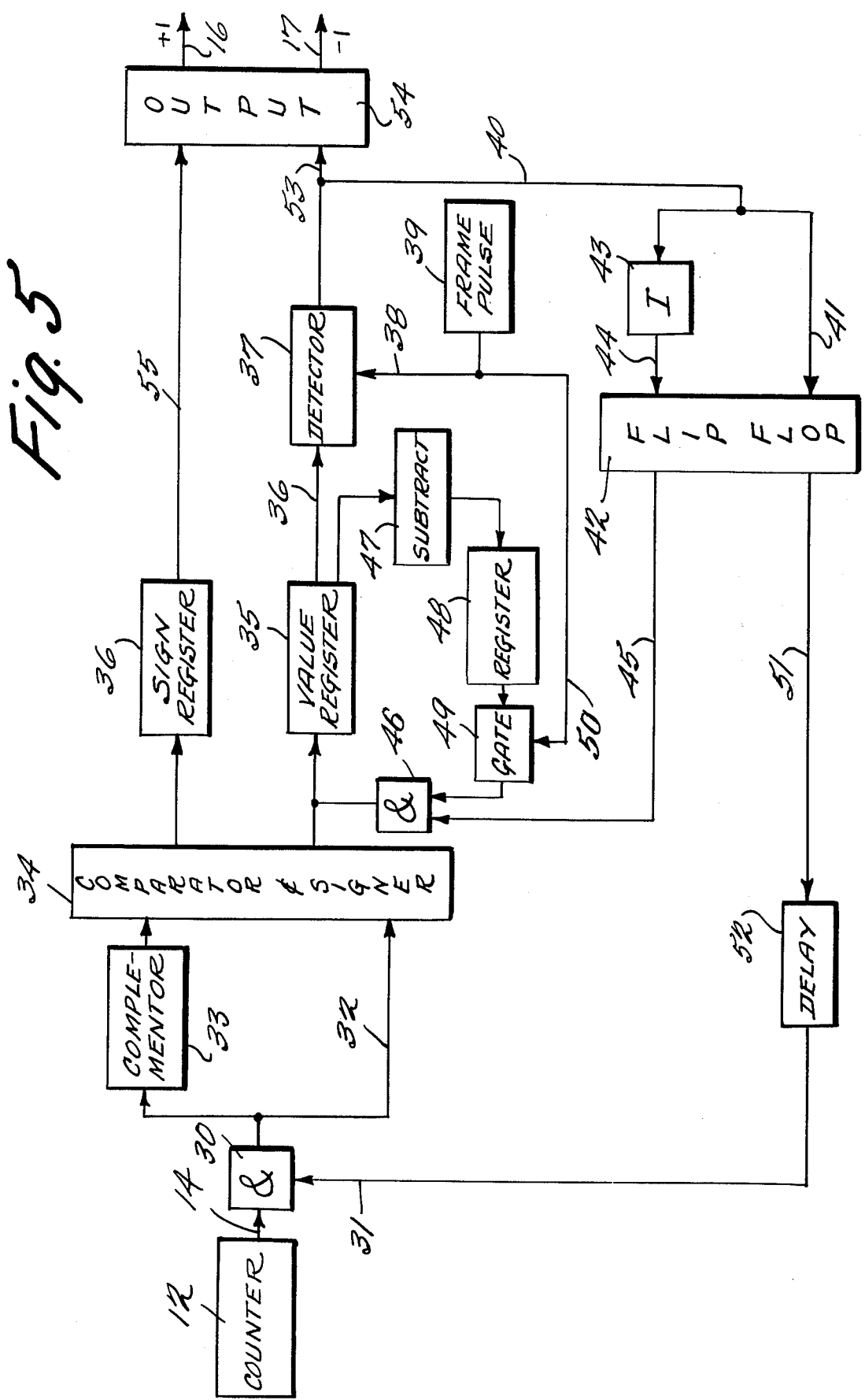

SYNCHRONIZATION SYSTEM FOR TIME DIVISION MULTIPLE ACCESS RELAY COMMUNICATIONS SYSTEM

BACKGROUND OF THE INVENTION

The invention relates to a Time Division Multiple Access (TDMA) synchronization system. The invention is particularly concerned with communications satellite relay systems.

In TDMA systems currently envisaged for commercial communication satellites, the earth stations would transmit their respective digital data traffic at specified respectively corresponding times within an overall time frame. In such proposals, a special carrier frequency burst transmitted from a reference station defines the start of the time frame and must be received by all other earth stations. Comparison of the measured time difference between the received reference burst and a particular station's own received traffic data burst is used as a basis for the control of that station's transmitted traffic data burst timing. In such systems, special transmissions, which do not interfere with the TDMA traffic data transmissions of the other earth stations must also be made by any earth station desiring to initiate its entry into the operating TDMA system. However, provisions may also be made for rapid re-entry after short interruptions without going such an the initial acquisition procedure.

Such a prior art system requires each ground station to be able to receive its own TDMA traffic data transmission. In satellites which have spot beam antennas for the majority of the traffic, this prior art the above synchronization scheme may not be possible or desirable.

In future satellite relay systems there may be situations where the constraints imposed by the system demand an alternative synchronization system such as the invention described below.

SUMMARY OF THE INVENTION

It is an object of the present invention to provide a TDMA synchronization system for a satellite relay system so that each ground station has a frame rate controlled in frequency and phase to ensure that its transmission, as received by the satellite, is synchronized with the other ground stations transmissions at the satellite.

It is another object of the present invention to provide a synchronization system for a satellite relay system in which only a small proportion of the frequency capacity of a global transponder of the satellite is utilized for synchronization signals.

It is still another object of the present invention to provide a synchronization system for a satellite relay system which eliminates the need for special initial acquisition procedures throughout the communications system.

Finally it is an object of the present invention to provide synchronization for a satellite relay system in which certain of the synchronization control functions are simplified.

These and other objects and features of the present invention are realized and described below in a specific illustrative non-limiting embodiment of a satellite relay system which has been simplified to include one reference station and only two further ground stations. According to the present invention there is provided a synchronization system for a satellite relay system in which all ground stations modulate a carrier signal, the frequency of which is specific to each station, with a periodic signal having a fixed phase relationship to the frame rate at that station, and by a comparison of the periodic signal from a designated Reference station transmitted via the satellite with its periodic signal as received after transmission to and return from the satellite at all non-reference stations there is produced thereat a control signal which re-times the frame rate at the non-reference stations until the compared periodic signals are in phase and synchronization is achieved at the satellite.

Preferably the periodic signal is a sine wave which is frequency modulated onto the carrier signal. The preferred relationship between the frame timing and the periodic signal is such that unidirectional zero crossings (i.e. positive or negative-going zero crossings) coincide with the commencement of a frame.

BRIEF DESCRIPTION OF THE DRAWINGS

A complete understanding of the present invention and the above and other objects and advantages thereof may be gained from the consideration of the following detailed description presented in connection with the accompanying drawings which are described as follows:

FIG. 5 shows in greater detail a logic unit forming part of FIG. 2.

DETAILED DESCRIPTION

Figure 1:
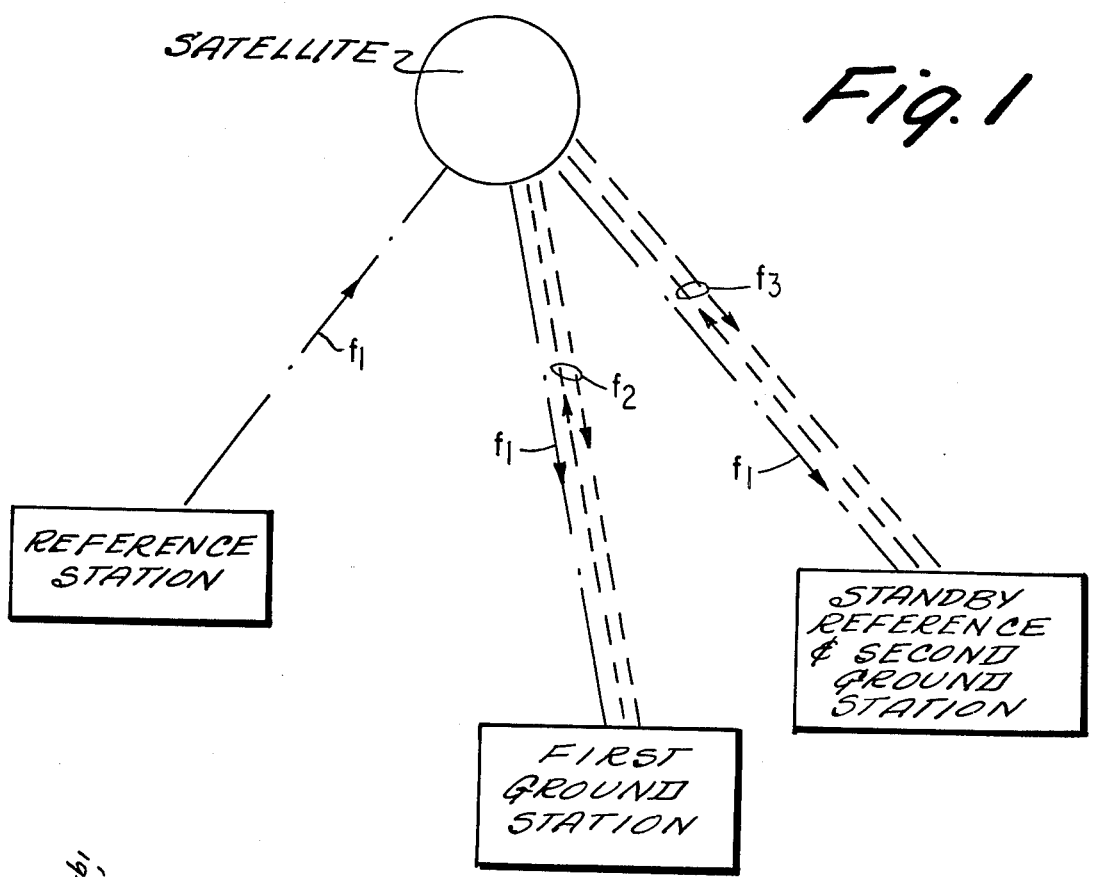
FIG. 1 shows schematically a communication satellite relay system.

TDMA systems are well-known and their application to communication satellite relay systems is also known and so will not be described in detail for the purposes of the present invention. FIG. 1 however shows the necessary operating integers of a TDMA communication satellite relay system to which the invention is applied. FIG. 1 shows a satellite geostationary relative to a reference station and a first and a second ground station. The transmission paths for the synchronizing signals (transmitted via at least one transponder in the satellite capable of communicating with all ground stations, i.e., a "global transponder.") are also illustrated on FIG. 1 and these will be dealt with in greater detail later in the description. As shown, the reference station transmissions on frequency $f_1$ are received by all other ground stations which, in turn, transmit and receive similar synchronization signals via independent channels $f_2$, $f_3$ etc.

Figure 2:
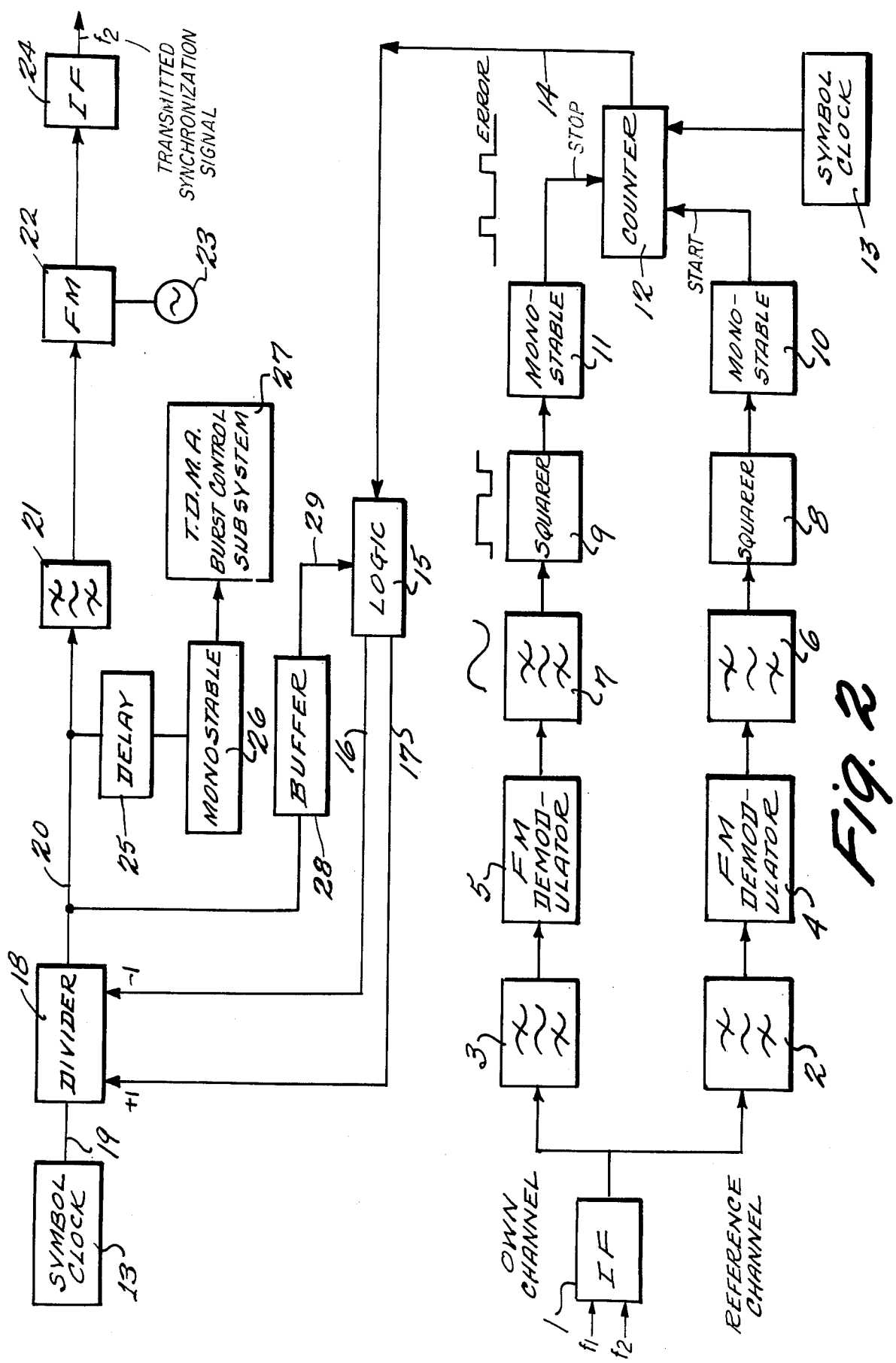
FIG. 2 shows a synchronization system for the satellite system of FIG. 1.

In a practical satellite system each ground station will contain a synchronizing system as shown in FIG. 2 however the reference station which may be any one of the ground stations will be modified so that no change is made to the frame timing. This enables the reference station to accept its own frame timing arrangement for the transmission of data without reference to any other station. The non-reference ground stations each include a synchronizing system as shown in FIG. 2 which operates to re-time the frame commencement at that station until the frame commencements of the reference station and that ground station are synchronized at the satellite.

Referring now to FIG. 2 the synchronization system includes demodulator means, detection and logic arrangement means, a timing wave generator means and a modulator means. The demodulator means derives its input from the IF stage 1 of the synchronization signal receiver of a ground station. For illustration, FIG. 2 depicts the situation at the "first ground station" shown in FIG. 1 where channels $f_1$ and $f_2$ are pertinent. The FM signal from the reference station (e.g. via carrier $f_1$) is separated from the FM signal of the local station (e.g. via carrier $f_2$) by means of filters 2 and 3 respectively, the outputs of which are demodulated by FM demodulators 4 and 5 respectively. The units 1 to 5 form the demodulator means. The two outputs from the demodulator means are applied by way of noise rejection filters 6 and 7 to pulse squarers 8 and 9 and monostable circuits 10 and 11 respectively. The squarer and monostable act as a zero-crossing detector unit for the periodic synchronization signal and produce an output which is fed to a controlled counter 12 which counts clock pulses from the symbol clock 13. The counter is arranged so that pulses from the symbol clock are counted and subsequently gated gated to the output line 14 starting upon the occurrence of a pulse from the reference channel monostable 10 and terminating upon the occurrence of a pulse from the own "channel" monostable 11.

Thus, if the "reference channel" start pulse briefly precedes the "own channel" stop pulse, a relatively few symbol clock pulses will have been counted in counter 12 indicating the magnitude of own channel phase lag in terms of symbol clock pulse time periods. On the other hand, if the own channel stop pulse briefly precedes the reference channel start pulse, a relatively large number of symbol clock pulses will have been counted in counter 12. The difference between the maximum number of such clock pulses possibly occurring between desired synchronization signal pulses and the actual counted number will thus indicate the magnitude of own channel phase lead in terms of symbol clock pulse time periods.

The contents of counter 12 is fed on lead 14 to a logic unit 15 to be described in greater detail below. Unit 15 derives phase advance or retard signals which are then fed through respective leads 16 and 17 to a frequency divider unit 18 which divides an input pulse train on lead 19 which is another output (same frequency) of symbol clock 13. The signals on leads 16 and 17 decrease or increase respectively the divisor of unit 18 and thus advance or retard respectively the phase of the divider output on lead 20. The divider output on lead 20 is fed via narrow-band pass filter 21 to an FM modulator 22. Modulator 22 is fed with a carrier signal from a carrier source unit 23 and delivers a frequency-modulated output to the IF stage of the ground station synchronization signal transmitter. The output of divider 18 on lead 20 is also fed via a delay unit 25 and a conventional monostable 26 to a TDMA Burst Control Sub-system 27. In addition, the signal on lead 20 is fed via a level buffer 28 to provide a timing pulse on lead 29 for logic unit 15.

Logic unit 15 is described in greater detail in FIG. 5 to which reference will now be made. The contents of counter 12 is fed via lead 14 to AND-gate 30 which receives a second input on lead 31. The output of gate 30 is fed directly via lead 32 and indirectly via a complementor 33 to a comparator and signer unit 34. If the number in counter 12 is greater than 11,256, which is half the number of symbols in a frame, this indicates a phase lead situation as described above and; then the complement of this number with respect to 22,512 (via complementor 33) is stored in a value register 35. Comparator 34 determines whether a number in the counter 12 is greater than 11,256 and stores a corresponding sign in a sign register 36. If the comparison in unit 34 shows the number in counter 12 to be 11,256 or less, (i.e., a phase lag situation as described above) then the number itself is stored in value register 35. The contents of register 35 is fed via lead 36 to a detector 37 which also receives a timing pulse on lead 38 which is in turn derived from a frame pulse unit 39 which delivers the pulses supplied on lead 29 in FIG. 2. The output of detector 37 is fed via lead 40 directly to form one input on lead 41 to a flip-flop 42 and via an inverter 43 to form a second input in opposite sense on lead 44. Provided the number in register 35 is greater than zero, detector 37 provides a "one" level input on lead 40 keeping flip-flop 42 in the "set" condition. The set output of flip-flop 42 is delivered via lead 45 to AND-gate 46 thus enabling a subtraction loop formed by subtractor 47 register 48 gate 49 and gate 46. Gate 49 is timed by pulses on lead 50 derived from the frame pulse unit 39. When the number in register 35 is zero, detector 37 provides a "zero" level input on lead 40 which "resets" flip-flop 42 thus providing a one level input on lead 51 which in turn is fed via delay element 52 to lead 31 to enable a new count to be transferred from counter 12. Successive one level inputs from detector 37 are also fed via lead 53 to output selector 54 which provides a one level signal on lead 16 or 17 in accordance with the sign delivered on lead 55 from sign register 36. A count less than 11,256 in counter 12 will cause a negative sign to be stored in sign register 36 and hence cause the output from selector 54 to be delivered on lead 17; a count greater than 11,256 in counter 12 will cause a positive sign to be stored in sign register 36 and accordingly the signal from output selector 54 to be delivered on lead 16. The signals on leads 16 and 17 are used to control the operation of the divider 18 as described in connection with FIG. 2.

The operation of the FIG. 5 circuit will be described starting from an assumed zero error situation where the contents of value register 35 is zero, the output of detector 37 is a zero level, a null output is on lines 16, 17 and an enabling reset is output from flip-flop 42. Then, after delay 52, gate 30 is enabled to pass the then existing contents of counter 12. Assume that such contents is $x$, a number less than 11,256. Then $x$ will be passed through directly to value register 35 while sign register 36 will be set to a "negative" contents. Detector 37 will sense the greater than zero contents of value register 35 and produce a one level output at 53 which will result in an output on line 17 decreasing the divisor of divider 18, thus increasing the phase of the synchronizing signal on $f_2$ to compensate for the detected phase lag thereof. The amount of phase advance for the first frame will be about equal to one symbol clock period since, in the exemplary embodiment, the divisor of 18 is decreased by only one unit from the total number of clock pulses per frame.

Upon the next frame pulse occurrence from line 50, gate 49 in the subtraction loop will be enabled to subtract one unit from the then existing contents of the value register 35. If the remaining value register contents are still greater than zero, the detector 37 will maintain its one level output thus maintaining the output on line 17 and causing another phase advance in the local synchronization signal on $f_2$ by about one clock pulse period. Progressive phase advance is thus produced in the local synchronization until the value register 35 contents goes to zero whereupon the detector 37 output goes to the zero level thereby removing the output on line 17 and resetting flip-flop 42. After a time delay 52 to insure that fresh phase comparison data is available, gate 30 is again enabled to pass the contents of counter 12 and restart the phase correction cycle.

If the detected phase error is leading rather than lagging, the procedure is substantially as just described with the exception that the sign register will store a positive contents thus causing output lead 16 to be energized rather than lead 17 and the contents of value register will comprise the complement of the counter 12 contents with respect to 22,512. In this case, the divisor of divider 18 will be increased by one unit thus retarding the phase of the local synchronization signal on $f_2$ by about one clock pulse period to compensate for the detected leading phase error.

In a specific satellite system the synchronization system according to this invention had its parameters limited by the satellite system requirements. Details of this specific system will now be described. The divider 18 must divide the symbol clock waveform from the output 19 by 22,512 (i.e., in the exemplary system there are 22,512 clock pulses per frame) when no external enabling signals are applied. It must change this divisor to either 22511 or 22513 when the relevant control wires 16 or 17 are enabled. The nominal frequency of the output of the divider will therefore be 1333⅓ Hz. The divided clock waveform is passed to the low-pass filter 21. The response of this filter should be chosen so that it attenuates the third and higher harmonics by at least 40 dB more than the fundamental.

The delay element 25 between the output 20 of the divider 18 and the input of the monostable 26 is arranged to equalize the delay of the path followed by the synchronizing sinusoid and the path followed by the TDMA signals themselves.

The timing signals for the TDMA burst control subsystem 27 are obtained from the monostable 26, the output of which remains positive for 33 ns following a positive-going edge on its input. The repetition frequency is 1333⅓ Hz and is in synchronism with the output of the divider 18.

The rise and fall times of the monostable output are less than 3 ns between 10% and 90% levels.

The FM modulator 22 accepts the 1333⅓ Hz sinusoidal waveform from the timing-wave generator. This waveform frequency modulates an externally-supplied carrier which lies within the range 52 MHz to 88 MHz.

The receiver channel filters 2 and 3 limit the total noise entering the demodulators 4 and 5 to keep the C/N ratio well above the FM threshold. If the carrier spacing is not less than 1.25 times the peak-to-peak deviation, the filters 2 and 3 preferably have 0.5 dB bandwidth not less than 40 KHz and give at least 20 dB rejection beyond 33 KHz from band center and at least 30 dB rejection beyond 80 KHz from band center.

The phase response of the filter is such that the delay experienced by that part of the FM wave which corresponds to the zero crossings of the modulating sinusoid does not vary by an amount which contributes significantly to the overall permitted timing error, for variations in carrier center frequency of ± 500 Hz.

By counting positive going edges of the 30 MHz symbol clock it is possible to measure (in units of one symbol clock pulse period) the timing differences between the two received sinusoids. The counter 12 is started by the pulse originating from the zero-crossing detector of the reference channel (e.g. $f_1$) and stopped by the corresponding pulse from the local channel (e.g. $f_2$) received back from the satellite. If the reference pulse arrives a small number of symbols before the local-looped-back pulse then the contents of the counter indicate by how much the local station lags the reference station at the satellite. If the local-looped-back pulse arrives a small number of symbols before the reference pulse then the resulting large number contained within the counter should be subtracted by the logic unit 15 from 22512 to give the number of symbols by which the local station leads the reference station at the satellite. The counter unit 12 and the logic unit 15 generates a number and a sign indicating the relative positions of the reference and local station sinusoids at the satellite measured in symbol periods.

It will be appreciated that although the sinusoid waveform period is directly related to the TDMA frame period it could be a multiple or sub multiple of the frame rate (i.e. frame period). The invention will operate provided the signals are harmonically related in a predetermined manner.

Figure 3:
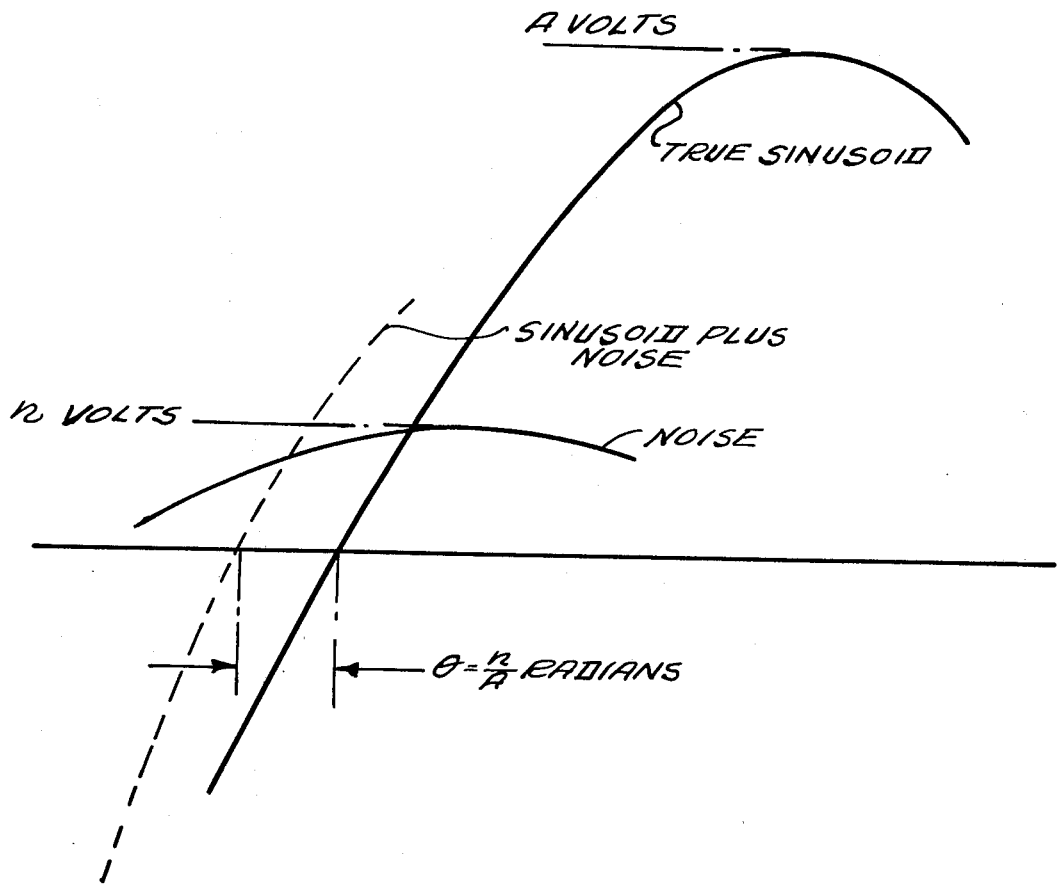
FIG. 3 shows graphically the error in zero crossing due to noise.

The narrow band noise rejection filters 6 and 7 following the FM demodulators 4 and 5 respectively give a very high signal to noise ratio. The small residual noise however produces a random error in the timing of the zero crossing as shown in FIG. 3.

If the instantaneous value of noise in the vicinity of the zero crossing is $n$ volts, then, since the gradient of the sinusoidal synchronization signal at the zero crossing is A volts per radian, the phase shift of the zero crossing due to the noise will be approximately $(n/A)$ radians.

Although the noise waveform appears sinusoidal in the short term due to the narrow band filters 6 and 7 in the longer term it will have a Gaussian distribution of amplitude. If the rms noise voltage is $\sigma$ the probability, $p$, of the zero crossings being shifted by an amount exceeding some specified value $\pm\theta$ radians is given by:

$$p = \text{erfc}\left[\frac{A\theta}{\sqrt{2}\,\sigma}\right] = \text{erfc}[\theta s] \qquad (1)$$

where erfc $(x)$ is defined as $$1 - \frac{2}{\sqrt{\pi}} \int_o^x e^{-t^2}\, dt$$

and $$S = \frac{1}{\sqrt{2}} \frac{A}{\sigma}$$

(rms signal to rms noise ratio) With the parameters of a known communication TDMA system one symbol corresponds to $2.8 \times 10^{-4}$ radians. Although the carrier/noise power ratio (c/n) before the demodulator might fall to as low as 10 dB for some of the time, the demodulated signal/noise power ratio $S^2$ after the noise-rejection filters 6 and 7 can be maintained in the region of 70–80 dB by suitable choice of the parameters. The relationship between these two ratios is $$s^2 = \frac{C}{N} \cdot \frac{B}{b} \cdot \frac{f_d^2}{f^2} \qquad (2)$$

where $B (= 2\sqrt{2}fd + 2f)$ is the r.f. noise bandwidth, is the bandwidth of the postdetection filters, 6 and 7, fd is the r.m.s. frequency deviation and f is the frequency of the modulating waveform.

Figure 4:
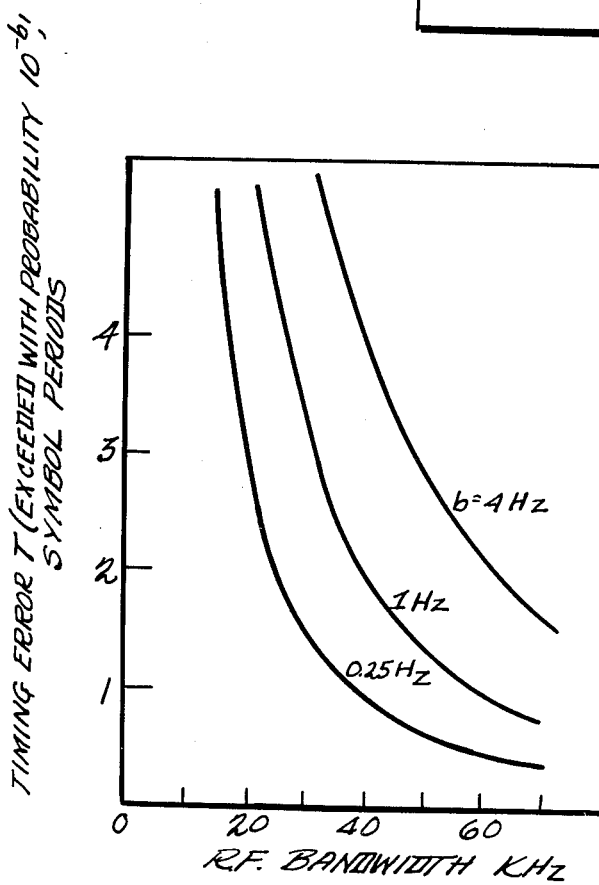
FIG. 4 shows graphically the relationship between occupied r.f. bandwidths needed to values of timing error exceeded with given probability.

The timing error T can be measured in symbol periods and is related directly to the phase error $\theta$ (by $T = 22512\theta/2\pi$ for the example chosen of 22512 bits per frame). T can then be related to the occupied radio-frequency bandwidth B by use of eqns. 1 and 2. The result is plotted in FIG. 4 for a c./n. ratio of 10 dB and for a probability of $10^{-6}$ that the error exceeds T symbols. Several possible values of post-detection filter bandwidth b are assumed. Over the range of interest, T is given by the approximate relationship $T = 470b^{1/2}$ (B−2) symbol periods, where b is in Hz and B is in kHz. T is reduced by a factor of $\sqrt{2}$ for each 3 dB by which the c.n. ratio exceeds 10 dB.

The choice of the value of b is determined mainly by practical design considerations and by the allowable response time of the system. The response time is bound to exceed 270 ms, this being the typical delay due to the satellite link.

The carrier-to noise ratio available from a global beam transponder when backed-off for multi-carrier working is approximately 13 dB. If it is assumed that the power allocated to the synchronizing signals is prorata to the bandwidth they use, then their C/N ratio will also be 13 dB. Allowing for a 3 dB degradation in the downpath component of the noise and 0.5 dB for transponder output power variation results in a C/N ratio of about 10.5 dB exceeded for all but a very small proportion of the time. In the case of the reference station and standby reference station (for example the second ground station shown on FIG. 1) transmissions it would be appropriate to increase the power allocated by say 6 dB to provide added safety margin and improved accuracy of timing.

The signal-to-noise ratio of the demodulated signal is given by:

$$S/N = C/N + 10 \log_{10} (B/b) + 20 \log_{10} (fd/f) dB \qquad (3)$$

where
B = RF noise bandwidth (B = $2 \sqrt{2}$ fd + 2f),
b = noise bandwidth of baseband filter,
fd = rms deviation,
f = frequency of modulating sinusoid, The bandwidth b of the filter after the demodulator is chosen to have as small a value as is practicable to permit high S/N ratio to be achieved, but not so small that it cannot pass the small variations in frequency of the synchronizing periodic wave occurring in normal operations or that it takes an excessive time for its output to respond to changes occurring in its input signal. The error in clock frequencies (specified maximum offset 1 in $10^7$) and the effect of Doppler shift (maximum rate about 20 ns/s) would together cause a maximum shift of about 0.00016 Hz in the frequency of the 1333 Hz wave, which can be considered negligible. The response time of the filter will be of the order of the reciprocal of its bandwidth, e.g. of the order of 1 second for a 1 Hz filter. This would be the time for which any error due to the presence of noise would persist and also the time it would take for corrections to make themselves felt at the output. Thus, during this period, further timing corrections should be inhibited by the control logic 15 after one correction has been completed. It is felt that choice of a bandwidth much less than 1 Hz would cause response times which could prove inconveniently long for normal operations. A bandwidth of 1 Hz on the other hand would have acceptable response time and also give adequate S/N ratio.

From the practical point of view stable filters with bandwidths of the order of 1 Hz at 1333 Hz center frequency are quite feasible. Attention will be necessary to achieve a reasonably constant phase shift around the center of the passband and to ensure that this phase shift does not vary with time (or more particularly that the difference between the phase shifts of the two receiving channel chains in the synchronization circuits does not vary).

In practice, the reference-stations's transmission could be allocated more power than the others, so that most of the error would be due to the noise associated with the station's own looped-back transmission. For example, if there were 50 stations in the TDMA system, and allowing 25% guard bands, the total bandwidth occupied by the synchronizing signals would be 2.5 MHz.

What is claimed is:
1. A synchronization system for a satellite communication Time Division Multiplex Access (TDMA) relay system having a predetermined frame period within which data bursts are transmitted and including a satellite relay and a plurality of ground stations, one of which is designated a reference station, said system comprising at each ground station:
   transmitter means for transmitting a carrier signal having a frequency which is characteristic of the respectively corresponding ground station thereby defining a frequency division channel characteristic of the respectively corresponding ground station,
   modulation means for modulating said carrier signal with a periodic signal having a period harmonically related to said frame period but which periodic signal is separate and distinct from said data bursts,
   phase comparator means at each non-reference ground station for comparing the phase relationship of its respectively corresponding periodic signal after transmission to and return from the satellite relay relative to the periodic signal transmitted from the designated reference ground station via the satellite, and
   control means at said non-reference ground stations responsive to said phase relationship to align the phase relationship of the compared periodic signals to achieve synchronization of the TDMA signals at the satellite.
2. A synchronization system as claimed in claim 1 wherein said modulation means contains timing means for determining the harmonic relationship between the frame period and the periodic signal so that unidirec- tional zero-crossings of the periodic signal coincide with the commencement of a frame period.

3. A synchronization system as claimed in claim 2 wherein said phase comparator means includes detection means for detecting positive-going zero-crossings of said periodic signals.

4. A synchronization system as claimed in claim 1 wherein said modulation means includes a sine wave generator the output of which comprises said periodic signal.

5. A synchronization system as claimed in claim 4 wherein said transmitter means includes a frequency modulation transmitter circuit for producing a signal frequency modulated by said periodic signal.

6. A synchronization system as claimed in claim 1 wherein said transmitter means at said designated reference ground station includes a power output circuit for said carrier signal to produce a carrier signal having a power output greater than the power output of carrier signals at the non-reference ground stations.

7. A synchronization system as claimed in claim 1 wherein the phase comparator means includes a counter the output of which represents the predetermined phase relationship.

8. A synchronization system as claimed in claim 7 wherein said phase comparator means includes a logic unit means arranged to receive the output from said counter and to determine the magnitude and direction of correction of the phase relationship to achieve alignment.

9. A synchronization system as claimed in claim 8 wherein each ground station contains the clock symbol generating means the output from which is fed to a divider circuit, the divisor of which is modified in accordance with the output from said logic unit means.

10. A synchronization system as claimed in claim 9 wherein the output from said divider circuit is fed to a TDMA burst control circuit which controls the timing bursts of said TDMA signals.

11. A synchronization system as claimed in claim 10 further including a time delay element at each non-reference ground station wherein the output from said divider is fed to said TDMA burst control arrangement by way of said time delay element which is arranged to equalize the time delay of the path followed by the periodic signal to and from the satellite and the path followed by the TDMA signals.

12. A synchronized time division multiple access relay communications system comprising:
    a plurality of ground communications stations each including means for transmitting and for receiving information bearing radio frequency signals,
    a remote relay means for receiving said information bearing radio frequency signals transmitted from any one of said ground stations and for retransmitting corresponding information bearing radio frequency signals to at least one of said ground stations,
    said relay means including at least one transponder means for simultaneously servicing all said ground stations on distinct frequency divided communications channels, each ground station being uniquely associated with a respectively associated one of said channels,
    said means for transmitting and for receiving at said ground stations including time division multiple access means for defining successive synchronized time frames within which each ground station transmits a burst of its respectively associated information bearing radio frequency signals during a corresponding predetermined portion of said time frame,
    a predetermined one of said ground stations constituting a reference station and including means for transmitting a periodic reference synchronization signal over its respectively associated distinct communications channel to all other ground stations, said periodic reference synchronization signal being harmonically related to the repetition rate of said time frames,
    each of the remaining ground stations including means for locally generating a periodic local synchronization signal and for transmitting and receiving same over its respectively associated distinct communications channel, said local synchronization signal having a nominal harmonic relationship to the expected repetition rate of said time frames,
    each of said remaining ground stations also including phase comparison means for comparing the phase of the received reference synchronization signal and the received local synchronization signal and means for determining the sense and magnitude of any detected phase difference therebetween, and
    each of said remaining ground stations also including phase control means for controllably advancing and retarding the phase of said local synchronization signal in response to said detected phase difference to reduce any such difference towards zero.

13. A synchronized time division multiple access relay communications system as in claim 12 wherein all said ground stations each include frequency modulation means for frequency modulating a predetermined carrier frequency signal with its respectively associated periodic synchronization signals and wherein each of said remaining ground stations include frequency demodulation means for recovering said received reference synchronization signal and said received local synchronization signal from the frequency modulated carrier signals corresponding to said reference ground station and to the local ground station respectively.

14. A synchronized time division multiple access relay communications system as in claim 12 wherein said means for transmitting said reference synchronization signal at said ground station includes means for transmitting a higher powered output than the output emanating from the means for transmitting the local synchronization signals from each of said remaining ground stations.

15. A synchronized time division multiple access relay communications system as in claim 12 wherein each of said phase comparison means comprises:
    a clock for producing regularly recurring clock pulses,
    a counter connected for counting said clock pulses when enabled, and
    phase sensitive counter control means for enabling said counter for the time duration between the detection of phase similarities in said received reference synchronization signal and said received local synchronization signal whereby the magnitude of the counter contents is indicative of both sense and magnitude of any phase difference between said received signals.

16. A synchronized time division multiple access relay communications system as in claim 15 further comprising logic means connected to receive the contents of said counter and to produce phase control output signals representative of the phase correction needed to reduce any detected phase difference towards zero.

17. A synchronized time division multiple access relay communications system as in claim 16 wherein each of said means for locally generating a periodic local synchronization signal includes a controllable divider means connected to divide said clock pulses by a divisor dependent upon said phase control output signals.

18. A synchronizing time division multiple access relay communications system as in claim 17 wherein said divider means normally divides by the nominal number of clock pulses included in each time frame but which is controlled to add a predetermined amount to the nominal divisor to retard the phase of the local synchronization signal and to subtract a predetermined amount from the nominal divisor to advance the phase of the local synchronization signal.

19. A synchronization time division multiple access relay communications system as in claim 18 wherein said logic means comprises:
  sign register means for storing data representing the sense of any detected phase difference,
  value register means for storing data representing the magnitude of any detected phase difference,
  comparator means for determining if said counter contents is less than or greater than substantially one-half said nominal number and for storing data in said sign register means and said value register means representative of the sense and magnitude respectively of any detected phase difference,
  detector output means connected to detect a non-zero contents of said value register and to produce said phase control output signals as required by the contents of said sign register means upon such detection,
  subtraction means for subtracting a predetermined value from the contents of said value register for each successive time frame thereby reducing the value register means contents to zero after sufficient time frames have elapsed to allow the magnitude of needed phase correction represented by the original contents of said value register means, and
  inhibition control means connected to inhibit data flow from said counter to said logic means while said value register means maintains a non-zero contents and until after the effected phase correction has had sufficient time to become reflected in said counter contents.

20. A synchronization time division multiple access relay communications system as in claim 19 including a time division multiple access burst timing control subsystem means controlled by the output of said divider means.

21. A synchronization time division multiple access relay communications system as in claim 20 further comprising a time delay means connected between said divider means and said timing control subsystem for equalizing the time delay in the communications circuits followed by the local synchronization signal including to and from the relay with the time delay in the communications circuits followed by the time division multiple access information bearing bursts.

22. A synchronized communication station for use in a synchronized time division multiple access relay communications system which includes a plurality of communications stations each including means for transmitting and for receiving information bearing radio frequency signals, a remote relay means for receiving said information bearing radio frequency signals transmitted from any one of said communications stations and for retransmitting corresponding information bearing radio frequency signals to at least one of said communication stations, said relay means including at least one transponder means for simultaneously servicing all said communications stations on distinct frequency divided communications channels, each communications station being uniquely associated with a respectively associated one of said channels, said means for transmitting and for receiving at said communications stations including time division multiple access means for defining successive synchronized time frames within which each ground station transmits a burst of its respectively associated information bearing radio frequency signals during a corresponding predetermined portion of said time frame, a predetermined one of said communications stations constituting a reference station and including means for transmitting a periodic reference synchronization signal over its respectively associated distinct communications channel to all other stations, said periodic reference synchronization signal being harmonically related to the repetition rate of said time frames; said synchronized communication station comprising:
  means for locally generating a periodic local synchronization signal and for transmitting and receiving same over its respectively associated distinct communications channel, said local synchronization signal having a nominal harmonic relationship to the expected repetition rate of said time frames,
  phase comparison means for comparing the phase of the received reference synchronization signal and the received local synchronization signal and means for determining the sense and magnitude of any detected phase difference therebetween, and
  phase control means for controllably advancing and retarding the phase of said local synchronization signal in response to said detected phase difference to reduce any such difference towards zero.

23. A synchronized communication station as in claim 22 including frequency modulation means for frequency modulating a predetermined carrier frequency signal with its respectively associated periodic synchronization signals and frequency demodulation means for recovering said received reference synchronization signal and said received local synchronization signal from the frequency modulated carrier signals corresponding to said reference ground station and to the local station respectively.

24. A synchronized communication station as in claim 22 wherein said means for transmitting the local synchronization signal includes means for transmitting a lower powered output than the output emanating from the means for transmitting said reference synchronization signal at said predetermined station.

25. A synchronized communication station as in claim 22 wherein said phase comparison means comprises:
  a clock for producing regularly recurring clock pulses,
  a counter connected for counting said clock pulses when enabled, and phase sensitive counter control means for enabling said counter for the time duration between the detection of phase similarities in said received reference synchronization signal and said received local synchronization signal whereby the magnitude of the counter contents is indicative of both sense and magnitude of any phase difference between said received signals.

26. A synchronized communication station as in claim 25 further comprising logic means connected to receive the contents of said counter and to produce phase control output signals representative of the phase correction needed to reduce any detected phase difference towards zero.

27. A synchronized communication station as in claim 26 wherein each of said means for locally generating a periodic local synchronization signal includes a controllable divider means connected to divide said clock pulses by a divisor dependent upon said phase control output signals.

28. A synchronized communication station as in claim 27 wherein said divider means normally divides by the nominal number of clock pulses included in each time frame but which is controlled to add a predetermined amount to the nominal divisor to retard the phase of the local synchronization signal and to subtract a predetermined amount from the nominal divisor to advance the phase of the local synchronization signal.

29. A synchronized communication station as in claim 28 wherein said logic means comprises:
sign register means for storing data representing the sense of any detected phase difference,
value register means for storing data representing the magnitude of any detected phase difference,
comparator means for determining if said counter contents is less than or greater than substantially one-half said nominal number and for storing data in said sign register means and said value register means representative of the sense and magnitude respectively of any detected phase difference,
detector output means connected to detect a non-zero contents of said value register and to produce said phase control output signals as required by the contents of said sign register means upon such detection,
subtraction means for subtracting a predetermined value from the contents of said value register for each successive time frame thereby reducing the value register means contents to zero after sufficient time frames have elapsed to allow the magnitude of needed phase correction represented by the original contents of said value register means, and
inhibition control means connected to inhibit data flow from said counter to said logic means while said value register means maintains a non-zero contents and until after the effected phase correction has had sufficient time to become reflected in said counter contents.

30. A synchronized communication station as in claim 29 including a time division multiple access burst timing control a subsystem means controlled by the output of said divider means.

31. A synchronized communication station as in claim 30 further comprising a time delay means connected between said divider means and said timing control subsystem for equalizing the time delay in the communications circuits followed by the local synchronization signal including to and from the relay with the time delay in the communications circuits followed by the time division multiple access information bearing bursts.

* * * * *